United States Patent
Arai

(10) Patent No.: US 12,515,644 B2
(45) Date of Patent: Jan. 6, 2026

(54) VEHICLE DECELERATION ASSISTANCE APPARATUS

(71) Applicants: TOYOTA JIDOSHA KABUSHIKI KAISHA, Toyota (JP); DENSO CORPORATION, Kariya (JP)

(72) Inventor: Chiemi Arai, Susono (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 188 days.

(21) Appl. No.: 18/460,153

(22) Filed: Sep. 1, 2023

(65) Prior Publication Data

US 2024/0140410 A1 May 2, 2024

(30) Foreign Application Priority Data

Nov. 1, 2022 (JP) ................. 2022-175362

(51) Int. Cl.
*B60W 30/09* (2012.01)
*B60T 7/12* (2006.01)
*B60W 30/14* (2006.01)

(52) U.S. Cl.
CPC ............. *B60W 30/09* (2013.01); *B60T 7/12* (2013.01); *B60W 30/143* (2013.01); *B60W 2554/4041* (2020.02)

(58) Field of Classification Search
CPC ..... B60T 7/12; B60T 7/18; B60T 7/22; B60T 2210/00; B60W 30/09; B60W 30/143;
(Continued)

(56) References Cited

U.S. PATENT DOCUMENTS

| 8,355,851 B2 | 1/2013 | Inoue et al. |
| 8,370,040 B2 | 2/2013 | Inoue et al. |

(Continued)

FOREIGN PATENT DOCUMENTS

| DE | 102023209953 A1 * | 4/2024 | ........ B60W 30/0956 |
| FR | 3112522 A1 * | 1/2022 | ......... G01C 21/3691 |

(Continued)

*Primary Examiner* — Atul Trivedi
(74) *Attorney, Agent, or Firm* — Sughrue Mion, PLLC

(57) ABSTRACT

A vehicle deceleration assistance apparatus proposes a decrease of an assistance level by a deceleration assistance control to an operator or autonomously decreases the assistance level when a weak acceleration or deceleration operation is carried out a predetermined weak acceleration or deceleration operation number of times or more. The weak acceleration operation is an acceleration operation satisfying a predetermined acceleration operation condition that the acceleration operation having an acceleration operation degree equal to or smaller than a predetermined acceleration operation degree, continues being carried out for a predetermined acceleration operation period of time. The weak deceleration operation is a deceleration operation satisfying a predetermined deceleration operation condition that the deceleration operation having a deceleration operation degree equal to or smaller than a predetermined deceleration operation degree, continues being carried out for a predetermined deceleration operation period of time.

9 Claims, 6 Drawing Sheets

(58) Field of Classification Search
CPC ......... B60W 30/18009; B60W 50/06; B60W 2554/4041
USPC .......................................................... 701/96
See application file for complete search history.

(56) References Cited

U.S. PATENT DOCUMENTS

| | | | |
|---|---|---|---|
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 11,634,130 B2 * | 4/2023 | McCormick | B60W 30/14 |
| | | | 701/96 |
| 2018/0345963 A1 * | 12/2018 | Maura | B60W 60/0011 |
| 2019/0295419 A1 | 9/2019 | Tosa et al. | |
| 2020/0231156 A1 | 7/2020 | Ito et al. | |
| 2020/0391731 A1 * | 12/2020 | Cheon | B60W 10/18 |
| 2021/0070291 A1 * | 3/2021 | Yu | B60W 30/162 |
| 2021/0094568 A1 * | 4/2021 | Nakanishi | B60W 60/005 |
| 2021/0139034 A1 * | 5/2021 | Otake | B60W 30/18009 |
| 2021/0146893 A1 * | 5/2021 | Schori | B60W 10/18 |
| 2021/0146896 A1 * | 5/2021 | Bush | B60Q 1/302 |
| 2021/0171022 A1 * | 6/2021 | Tsuchiya | B60W 50/12 |
| 2021/0179039 A1 * | 6/2021 | Kakeshita | B60T 8/171 |
| 2022/0212665 A1 * | 7/2022 | Tanaka | B60W 60/00 |
| 2022/0234599 A1 * | 7/2022 | Tsuji | B60W 10/18 |
| 2022/0250614 A1 * | 8/2022 | Ota | B60W 30/09 |
| 2022/0289176 A1 * | 9/2022 | Baek | B60W 10/20 |
| 2022/0306142 A1 * | 9/2022 | Taniguchi | B60K 35/29 |
| 2022/0306153 A1 * | 9/2022 | Goto | B60W 60/0011 |
| 2022/0332319 A1 * | 10/2022 | Park | G08G 1/165 |
| 2022/0348227 A1 * | 11/2022 | Foster | B60Q 1/507 |
| 2022/0371583 A1 * | 11/2022 | Kario | B60W 30/0956 |
| 2022/0410857 A1 * | 12/2022 | Li | B60T 8/92 |
| 2023/0008744 A1 * | 1/2023 | Kozono | G06V 20/58 |
| 2023/0022820 A1 * | 1/2023 | Ogino | B60T 8/171 |
| 2023/0035434 A1 * | 2/2023 | Ishii | B60W 30/18009 |
| 2023/0037767 A1 * | 2/2023 | Yang | G08G 1/167 |
| 2023/0068472 A1 * | 3/2023 | Kawasaki | B60W 30/143 |
| 2023/0145836 A1 * | 5/2023 | Kamatani | B60W 50/10 |
| | | | 701/70 |
| 2023/0159028 A1 * | 5/2023 | Fukui | B60W 30/0956 |
| | | | 701/301 |
| 2023/0192107 A1 * | 6/2023 | Ueno | B60W 60/00 |
| | | | 701/1 |
| 2023/0202475 A1 * | 6/2023 | Tsuchiya | B60W 30/146 |
| | | | 701/93 |
| 2023/0202479 A1 * | 6/2023 | Horiguchi | B60W 30/18163 |
| | | | 701/93 |
| 2023/0219571 A1 * | 7/2023 | Ito | B60W 30/095 |
| | | | 701/70 |
| 2023/0227039 A1 * | 7/2023 | Ikai | B60W 30/18027 |
| | | | 701/70 |
| 2023/0278552 A1 * | 9/2023 | Park | B60W 30/0953 |
| | | | 701/93 |
| 2023/0391301 A1 * | 12/2023 | Pawar | B60T 8/172 |
| 2024/0075932 A1 * | 3/2024 | Ikezawa | B60W 30/09 |
| 2024/0075933 A1 * | 3/2024 | Ikezawa | B60W 30/18154 |
| 2024/0092360 A1 * | 3/2024 | Niizeki | B60W 30/0956 |
| 2024/0140410 A1 * | 5/2024 | Arai | B60T 7/12 |
| 2025/0115279 A1 * | 4/2025 | Stein | B60W 60/0015 |
| 2025/0121821 A1 * | 4/2025 | Hiraiwa | B60W 30/09 |

FOREIGN PATENT DOCUMENTS

| | | |
|---|---|---|
| JP | 2004-338505 A | 12/2004 |
| JP | 2020-114705 A | 7/2020 |

\* cited by examiner

VEHICLE DECELERATION ASSISTANCE APPARATUS

CROSS-REFERENCE TO RELATED APPLICATIONS

This application claims priority to Japanese patent application No. JP 2022-175362 filed on Nov. 1, 2022 the content of which is hereby incorporated by reference in its entirety.

BACKGROUND

Field

The present invention relates to a vehicle deceleration assistance apparatus.

Description of the Related Art

There is known a vehicle deceleration assistance apparatus which executes a deceleration assistance control or autonomously decelerate a vehicle when a driver does not carry out an operation to decelerate the vehicle although the driver should carry out the operation. Also, there is known a vehicle deceleration assistance apparatus which is configured to execute the deceleration assistance control when the vehicle moves on a road, and not to execute the deceleration assistance control when the vehicle moves in a parking lot (for example, refer to JP 2020-114705 A).

For example, when a deceleration rate of the vehicle by the deceleration assistance control is too great, the driver may feel that an assistance level by the deceleration assistance control is excessive. When the vehicle deceleration assistance apparatus is configured such that the assistance level such as the deceleration rate of the vehicle by the deceleration assistance control can be changed, the driver can change the assistance level. However, some drivers drives the vehicle without changing the assistance level. In this case, convenience for the driver can be improved by proposing a deceleration of the assistance level to the driver, or autonomously decreasing the assistance level.

SUMMARY

An object of the present invention is to provide a vehicle deceleration assistance apparatus which can appropriately propose the decrease of the assistance level by the deceleration to the driver, or appropriately and autonomously decrease the assistance level by the deceleration assistance control.

According to the present invention, a vehicle deceleration assistance apparatus comprises an electronic control unit which executes a deceleration assistance control for assisting a deceleration of a vehicle when (i) a distance between the vehicle and a deceleration assistance target becomes equal to or smaller than a predetermined distance, and (ii) an acceleration operation and a deceleration operation are not carried out by an operator of the vehicle. The electronic control unit is configured to (i) propose a decrease of an assistance level by the deceleration assistance control to the operator or (ii) autonomously decrease the assistance level by the deceleration assistance control when a weak acceleration operation is carried out a predetermined weak acceleration operation number of times or more. In this regard, the weak acceleration operation is the acceleration operation satisfying a predetermined acceleration operation condition that the acceleration operation having an acceleration operation degree equal to or smaller than a predetermined acceleration operation degree, continues being carried out for a predetermined acceleration operation period of time. Further, the electronic control unit is configured to (i) propose the decrease of the assistance level by the deceleration assistance control to the operator or (ii) autonomously decrease the assistance level by the deceleration assistance control when a weak deceleration operation is carried out a predetermined weak deceleration operation number of times or more. In this regard, the weak deceleration operation is the deceleration operation satisfying a predetermined deceleration operation condition that the deceleration operation having a deceleration operation degree equal to or smaller than a predetermined deceleration operation degree, continues being carried out for a predetermined deceleration operation period of time.

When the assistance level by the deceleration assistance is excessive for the operator of the vehicle, the operator may continue carrying out the acceleration or deceleration operation having a relatively small degree for a certain period of time. Therefore, when the number of times that the operator continues carrying out the acceleration or deceleration operation having the relatively small degree for a certain period of time, is great, the current assistance level may be excessive for the operator.

With the vehicle deceleration assistance apparatus according to the present invention, the weak acceleration operation is the acceleration operation satisfying the predetermined acceleration operation condition that the acceleration operation having the acceleration operation degree equal to or smaller than the predetermined acceleration operation degree, continues being carried out for the predetermined acceleration operation period of time. In addition, the weak deceleration operation is the deceleration operation satisfying the predetermined deceleration operation condition that the deceleration operation having the deceleration operation degree equal to or smaller than the predetermined deceleration operation degree, continues being carried out for the predetermined deceleration operation period of time. When the weak acceleration operation is carried out the predetermined weak acceleration operation number of times or more, the decrease of the assistance level by the deceleration assistance control is proposed to the operator, or the assistance level by the deceleration assistance control is autonomously decreased. Alternatively, when the weak deceleration operation is carried out the predetermined weak deceleration operation number of times or more, the decrease of the assistance level by the deceleration assistance control is proposed to the operator, or the assistance level by the deceleration assistance control is autonomously decreased. Thus, the decrease of the assistance level by the deceleration assistance control can be appropriately proposed to the operator, or the assistance level by the deceleration assistance control can be appropriately and autonomously decreased.

According to an aspect of the present invention, when (i) the deceleration assistance control is executed, and (ii) the acceleration operation is carried out, a first condition may be used as the predetermined acceleration operation condition, a first degree may be used as the predetermined acceleration operation degree, and a first period of time may be used as the predetermined acceleration operation period of time. In this regard, the first condition may be a condition that the acceleration operation having the acceleration operation degree equal to or smaller than the first degree, continues being carried out for the first period of time. Further, when (i) the deceleration assistance control is not executed, and (ii) the acceleration operation is carried out, a second condition may be used as the predetermined acceleration operation condition, a second degree may be used as the predetermined acceleration operation degree, and a second period of time may be used as the predetermined acceleration operation period of time. In this regard, the second condition may be a condition that (i) the acceleration operation having the acceleration operation degree equal to or smaller than the second degree, continues being carried out for the second period of time, and (ii) a deceleration rate of the vehicle is equal to or smaller than a non-assistance acceleration operation deceleration rate. Furthermore, when (i) the deceleration assistance control is executed, and (ii) the deceleration operation is carried out, a third condition may be used as the predetermined deceleration operation condition, a third degree may be used as the predetermined deceleration operation degree, and a third period of time may be used as the predetermined deceleration operation period of time. In this regard, the third condition may be a condition that the deceleration operation having the deceleration operation degree equal to or smaller than the third degree, continues being carried out for the third period of time. Furthermore, when (i) the deceleration assistance control is not executed, and (ii) the deceleration operation is carried out, a fourth condition may be used as the predetermined deceleration operation condition, a fourth degree may be used as the predetermined deceleration operation degree, and a fourth period of time may be used as the predetermined deceleration operation period of time. In this regard, the fourth condition may be a condition that (i) the deceleration operation having the deceleration operation degree equal to or smaller than the fourth degree, continues being carried out for the fourth period of time, and (ii) the deceleration rate of the vehicle is equal to or smaller than a non-assistance deceleration operation deceleration rate.

When the operator has a feeling that the assistance level by the deceleration assistance control is excessive, the operator carries out the weak acceleration or deceleration operation in different manners, depending on whether the deceleration assistance control is executed or not. Therefore, in order to accurately determine whether the operator has a feeling that the assistance level by the deceleration assistance control is excessive, it is effective to use different conditions for proposing the decrease of the assistance level by the deceleration assistance control to the operator or autonomously decreasing the assistance level by the deceleration assistance control, depending on whether the deceleration assistance control is executed or not.

With the vehicle deceleration assistance apparatus according to this aspect of the present invention, the different conditions are used as the predetermined acceleration or deceleration operation condition, depending on the deceleration assistance control is executed or not. Thus, the decrease of the assistance level by the deceleration assistance control can be proposed to the operator, or the assistance level by the deceleration control can be autonomously decreased, depending on an accurate determination of whether the operator has a feeling that the assistance level by the deceleration assistance control is excessive.

According to another aspect of the present invention, when (i) the deceleration assistance control is executed, and (ii) the acceleration operation is carried out, a first condition may be used as the predetermined acceleration operation condition, a first degree may be used as the predetermined acceleration operation degree, and a first period of time may be used as the predetermined acceleration operation period of time. In this regard, the first condition may be a condition that the acceleration operation having the acceleration operation degree equal to or smaller than the first degree, continues being carried out for the first period of time. Further, when (i) the deceleration assistance target is detected, (ii) the deceleration assistance control is not executed, and (iii) the acceleration operation is carried out, a second condition may be used as the predetermined acceleration operation condition, a second degree may be used as the predetermined acceleration operation degree, and a second period of time may be used as the predetermined acceleration operation period of time. In this regard, the second condition may be a condition that (i) the acceleration operation having the acceleration operation degree equal to or smaller than the second degree, continues being carried out for the second period of time, and (ii) a deceleration rate of the vehicle is equal to or smaller than a non-assistance acceleration operation deceleration rate. Furthermore, when (i) the deceleration assistance control is executed, and (ii) the deceleration operation is carried out, a third condition may be used as the predetermined deceleration operation condition, a third degree may be used as the predetermined deceleration operation degree, and a third period of time may be used as the predetermined deceleration operation period of time. The third condition may be a condition that the deceleration operation having the deceleration operation degree equal to or smaller than the third degree, continues being carried out for the third period of time. Furthermore, when (i) the deceleration assistance target is detected, (ii) the deceleration assistance control is not executed, and (iii) the deceleration operation is carried out, a fourth condition may be used as the predetermined deceleration operation condition, a fourth degree may be used as the predetermined deceleration operation degree, and a fourth period of time may be used as the predetermined deceleration operation period of time. In this regard, the fourth condition may be a condition that (i) the deceleration operation having the deceleration operation degree equal to or smaller than the fourth degree, continues being carried out for the fourth period of time, and (ii) the deceleration rate of the vehicle is equal to or smaller than a non-assistance deceleration operation deceleration rate.

The operator having a feeling that the assistance level by the deceleration assistance control is excessive, carries out the weak acceleration or deceleration operation in different manners, depending on whether the deceleration assistance control is executed, or the deceleration assistance target is detected but the deceleration assistance control is not executed. Therefore, in order to accurately determine whether the operator has a feeling that the assistance level by the deceleration assistance control is excessive, it is effective to use different conditions for proposing the decrease of the assistance level by the deceleration assistance control to the operator or autonomously decreasing the assistance level by the deceleration assistance control, depending on whether the deceleration assistance control is executed, or the deceleration assistance target is detected but the deceleration assistance control is not executed.

With the vehicle deceleration assistance apparatus according to this aspect of the present invention, the different conditions are used as the predetermined acceleration or deceleration operation condition, depending on whether the deceleration assistance control is executed, or the deceleration assistance target is detected but the deceleration assistance control is not executed. Thus, the decrease of the assistance level by the deceleration assistance control can be proposed to the operator, or the assistance level by the deceleration control can be autonomously decreased, depending on an accurate determination of whether the operator has a feeling that the assistance level by the deceleration assistance control is excessive.

According to further, another aspect of the present invention, the electronic control unit may be configured to autonomously decrease the assistance level when (i) the weak acceleration operation satisfying the predetermined acceleration operation condition is carried out the predetermined weak acceleration operation number of times or more, or (ii) the weak deceleration operation satisfying the predetermined deceleration operation condition is carried out the predetermined weak deceleration operation number of times or more. Further, the electronic control unit may be configured to use different manners of autonomously decreasing the assistance level, depending on whether (i) the weak acceleration operation satisfying the first condition is carried out the predetermined weak acceleration operation number of times or more, or (ii) the weak acceleration operation satisfying the second condition is carried out the predetermined weak acceleration operation number of times or more. Furthermore, the electronic control unit may be configured to use different manners of autonomously decreasing the assistance level, depending on whether (i) the weak deceleration operation satisfying the third condition is carried out the predetermined weak deceleration operation number of times or more, or (ii) the weak deceleration operation satisfying the fourth condition is carried out the predetermined weak deceleration operation number of times or more.

The operator may have different feelings of excessiveness of the assistance level by the deceleration assistance control, depending on whether the operator carries out the weak acceleration or deceleration operation while the deceleration assistance control is executed, or the operator carries out the weak acceleration or deceleration operation while the deceleration assistance control is not executed.

With the vehicle deceleration assistance apparatus according to this aspect of the present invention, the different manners of autonomously decreasing the assistance level are used, depending on whether (i) the weak acceleration operation satisfying the first condition is carried out the predetermined weak acceleration operation number of times or more, or (ii) the weak acceleration operation satisfying the second condition is carried out the predetermined weak acceleration operation number of times or more. Further, the different manners of autonomously decreasing the assistance level are used, depending on whether (i) the weak deceleration operation satisfying the third condition is carried out the predetermined weak deceleration operation number of times or more, or (ii) the weak deceleration operation satisfying the fourth condition is carried out the predetermined weak deceleration operation number of times or more. Thus, the autonomous decrease of the assistance level can be realized, depending on the operator's feeling of excessiveness of the assistance level by the deceleration assistance control.

According to further, another aspect of the present invention, the electronic control unit may be configured to acquire the number of times that the weak acceleration operation or the weak deceleration operation is carried out while the vehicle is in an activated state that the vehicle can move, and reset the acquired number of times when the vehicle changes from the activated state to a non-activated state that the vehicle cannot move.

The operator's feeling of the excessiveness of the assistance level by the deceleration assistance control depends on the operator of the vehicle. Therefore, in order to accurately determine whether the operator has a feeling that the assistance level by the deceleration assistance control is excessive, it is effective to consider whether the operators changes. When the vehicle changes from the state that the vehicle can move to the state that the vehicle cannot move, the operators may change.

With the vehicle deceleration assistance apparatus according to this aspect of the present invention, the acquired number of times of the weak acceleration or deceleration operations is reset when the vehicle changes from the activated state to the non-activated state. Thus, the decrease of the assistance level can be appropriately proposed to the operator, or the assistance level can be appropriately and autonomously decreased, depending on the operator's feeling of the excessiveness of the assistance level by the deceleration assistance control.

According to the present invention, a vehicle deceleration assistance method is a method for executing a deceleration assistance control for assisting a deceleration of a vehicle when (i) a distance between the vehicle and a deceleration assistance target becomes equal to or smaller than a predetermined distance, and (ii) an acceleration operation and a deceleration operation are not carried out by an operator of the vehicle. The vehicle deceleration assistance method according to the present invention comprises at least one of steps of (i) propose a decrease of an assistance level by the deceleration assistance control to the operator or autonomously decrease the assistance level by the deceleration assistance control when a weak acceleration operation is carried out a predetermined weak acceleration operation number of times or more, and (ii) propose the decrease of the assistance level by the deceleration assistance control to the operator or autonomously decrease the assistance level by the deceleration assistance control when a weak deceleration operation is carried out a predetermined weak deceleration operation number of times or more. The weak acceleration operation is the acceleration operation satisfying a predetermined acceleration operation condition that the acceleration operation having an acceleration operation degree equal to or smaller than a predetermined acceleration operation degree, continues being carried out for a predetermined acceleration operation period of time. The weak deceleration operation is the deceleration operation satisfying a predetermined deceleration operation condition that the deceleration operation having a deceleration operation degree equal to or smaller than a predetermined deceleration operation degree, continues being carried out for a predetermined deceleration operation period of time.

With the vehicle deceleration assistance method according to the present invention, for the same reasons as those described above, the decrease of the assistance level by the deceleration assistance control can be appropriately proposed to the operator, or the assistance level by the deceleration assistance control can be appropriately and autonomously decreased.

According to the present invention, a computer-readable storage medium is a medium which stores a vehicle driving assistance program which executes a deceleration assistance control for assisting a deceleration of a vehicle when (i) a distance between the vehicle and a deceleration assistance target becomes equal to or smaller than a predetermined distance, and (ii) an acceleration operation and a deceleration operation are not carried out by an operator of the vehicle. The vehicle deceleration assistance program is configured to (i) propose a decrease of an assistance level by the deceleration assistance control to the operator or (ii) autonomously decrease the assistance level by the deceleration assistance control when a weak acceleration operation is carried out a predetermined weak acceleration operation number of times or more. In this regard, the weak acceleration operation is the acceleration operation satisfying a predetermined acceleration operation condition that the acceleration operation having an acceleration operation degree equal to or smaller than a predetermined acceleration operation degree, continues being carried out for a predetermined acceleration operation period of time. Further, the vehicle deceleration assistance program is configured to (i) propose the decrease of the assistance level by the deceleration assistance control to the operator or (ii) autonomously decrease the assistance level by the deceleration assistance control when a weak deceleration operation is carried out a predetermined weak deceleration operation number of times or more. In this regard, the weak deceleration operation is the deceleration operation satisfying a predetermined deceleration operation condition that the deceleration operation having a deceleration operation degree equal to or smaller than a predetermined deceleration operation degree, continues being carried out for a predetermined deceleration operation period of time.

With the vehicle deceleration assistance program according to the present invention, for the same reasons as those described above, the decrease of the assistance level by the deceleration assistance control can be appropriately proposed to the operator, or the assistance level by the deceleration assistance control can be appropriately and autonomously decreased.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
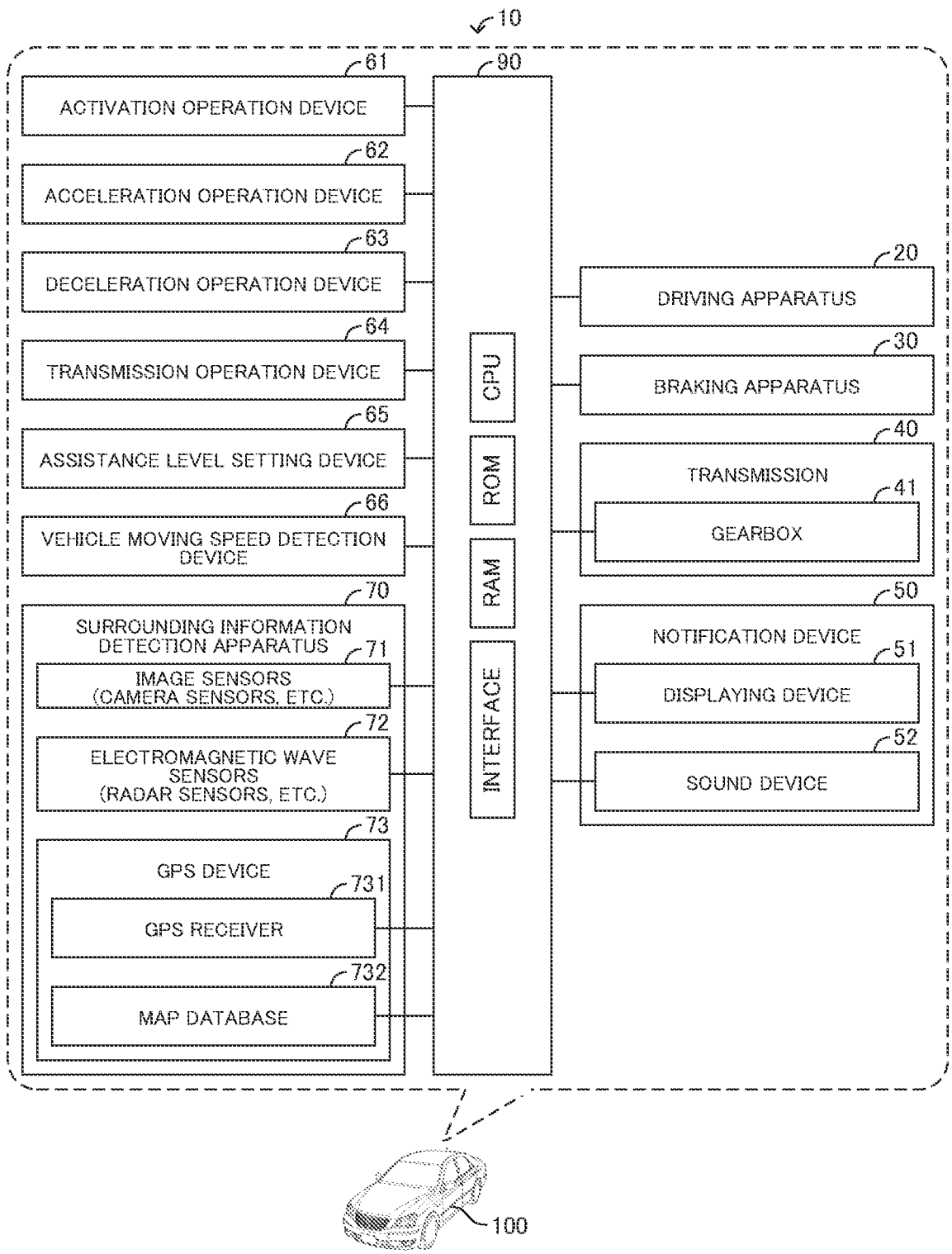
FIG. 1 is a view which shows a vehicle control apparatus including a vehicle deceleration assistance apparatus according to an embodiment of the present invention.

Below, a vehicle control apparatus including a vehicle deceleration assistance apparatus according to an embodiment of the present invention, will be described with reference to the drawings. The vehicle control apparatus 10 according to the embodiment of the present invention is shown in FIG. 1.

Below, the vehicle control apparatus 10 will be described with an example that an operator of a vehicle 100 is a driver of the vehicle 100 who is in the vehicle 100 and drives the vehicle 100. Therefore, in this embodiment, the vehicle control apparatus 10 is installed on the vehicle 100 as shown in FIG. 1.

In this regard, the operator of the vehicle 100 may be a remote operator of the vehicle 100 who is not in the vehicle 100 and remotely drives the vehicle 100. When the operator of the vehicle 100 is the remote operator, the vehicle control apparatuses 10 are installed on the vehicle 100 and a remote operation facility, respectively. The remote operation facility is a facility provided outside of the vehicle 100 for remotely driving the vehicle 100. In this case, functions realized by the vehicle control apparatus 10 described later are achieved by the vehicle control apparatus 10 installed on the vehicle 100 and the vehicle control apparatus 10 installed on the remote operation facility.

ECU

As shown in FIG. 1, the vehicle control apparatus 10 includes an ECU 90. The ECU 90 is an electronic control unit. The ECU 90 includes a microcomputer as a main component. The microcomputer includes a CPU, a ROM, a RAM, a non-volatile memory, and an interface. The CPU realizes various functions by executing instructions, programs, or routines stored in the ROM. In this embodiment, the vehicle control apparatus 10 includes one ECU. In this regard, the vehicle control apparatus 10 may be configured to include a plurality of the ECUs and executes various processes by the ECUs, respectively.

Driving Apparatus, Etc.

Further, as shown in FIG. 1, the vehicle 100 is installed with a driving apparatus 20, a braking apparatus 30, a transmission 40, and a notification device 50.

Driving Apparatus

The driving apparatus 20 is an apparatus which outputs a driving force to be applied to the vehicle 100. The driving apparatus 20 includes an internal combustion engine and/or at least one electric motor. The driving apparatus 20 is electrically connected to the ECU 90. The ECU 90 controls the driving force output from the driving apparatus 20.

Braking Apparatus

The braking apparatus 30 is an apparatus which applies a braking force to the vehicle 100. The braking apparatus 30 includes a hydraulic brake apparatus. The braking apparatus 30 is electrically connected to the ECU 90. The ECU 90 controls the braking force applied to the vehicle 100 by the braking apparatus 30.

Transmission

The transmission 40 is an apparatus which changes a state of transmitting the driving force output from the driving apparatus 20 to the vehicle 100. In this embodiment, the transmission 40 is a gearbox 41. The gearbox 41 is electrically connected to the ECU 90. The ECU 90 sets a transmitting state of the gearbox 41 to any one of a forward driving transmitting state (or a drive transmitting state), a rearward driving transmitting state (or a reverse transmitting state), a neutral state, and a vehicle-stopped holding state (or a parking state). The drive transmitting state is a state of transmitting the driving force to the vehicle 100 so as to move the vehicle 100 forward. The reverse transmitting state is a state of transmitting the driving force to the vehicle 100 so as to move the vehicle 100 rearward. The neutral state is a state of not transmitting the driving force to the vehicle 100. The parking state is a state of holding the vehicle 100 stopped.

Notification Device

The notification device 50 is a device which notifies the operator of the vehicle 100 of various information. In this embodiment, the notification device 50 includes a displaying device 51 and a sound device 52.

Displaying Device

The displaying device 51 is a device which displays various images. The displaying device 51 may be a device such as a display as a part of a combination meter, a head-up display, and a display of a car navigation device. The displaying device 51 is installed on the vehicle 100 such that the driver of the vehicle 100 can see images displayed by the displaying device 51. The displaying device 51 is electrically connected to the ECU 90. The ECU 90 displays various images by the displaying device 51.

In particular, the vehicle control apparatus 10 proposes a deceleration of the vehicle 100 to the driver of the vehicle 100 by displaying a deceleration proposal image by the displaying device 51. The deceleration proposal image is an image which proposes the deceleration of the vehicle 100 to the driver of the vehicle 100.

It should be noted that when the operator of the vehicle 100 is the remote operator of the vehicle 100, the displaying device 51 is provided on the remote operation facility.

Sound Device

The sound device 52 is a device such as a speaker which outputs various announcements. The sound device 52 is provided on the vehicle 100 such that the driver of the vehicle 100 can hear the announcements output from the sound device 52. The sound device 52 is electrically connected to the ECU 90. The ECU 90 can output various announcements from the sound device 52.

The vehicle control apparatus 10 can propose the deceleration of the vehicle 100 to the driver of the vehicle 100 by outputting a deceleration proposal announcement from the sound device 52. The deceleration proposal announcement is an announcement to propose the deceleration of the vehicle 100 to the driver of the vehicle 100.

It should be noted that the operator of the vehicle 100 is the remote operator of the vehicle 100, the sound device 52 is installed on the remote operation facility.

Activation Operation Device, Etc.

Further, as shown in FIG. 1, the vehicle 100 is installed with an activation operation device 61, an acceleration operation device 62, a deceleration operation device 63, a transmission operation device 64, an assistance level setting device 65, a vehicle moving speed detection device 66, and a surrounding information detection apparatus 70.

Activation Operation Device

The activation operation device 61 is a device such as a switch which is operated by the driver to activate or deactivate the ECU 90. The activation operation device 61 corresponds to the known ignition switch. The activation operation device 61 is electrically connected to the ECU 90. When the ECU 90 is in a non-activated state, i.e., the ECU 90 is not activated, and the activation operation device 61 is operated, the ECU 90 turns to an activated state. On the other hand, when the ECU 90 is in the activated state, and the activation operation device 61 is operated, the ECU 90 turns to the non-activated state.

It should be noted that when the operator of the vehicle 100 is the remote operator of the vehicle 100, the activation operation device 61 is installed on the remote operation facility.

Acceleration Operation Device

Figure 2:
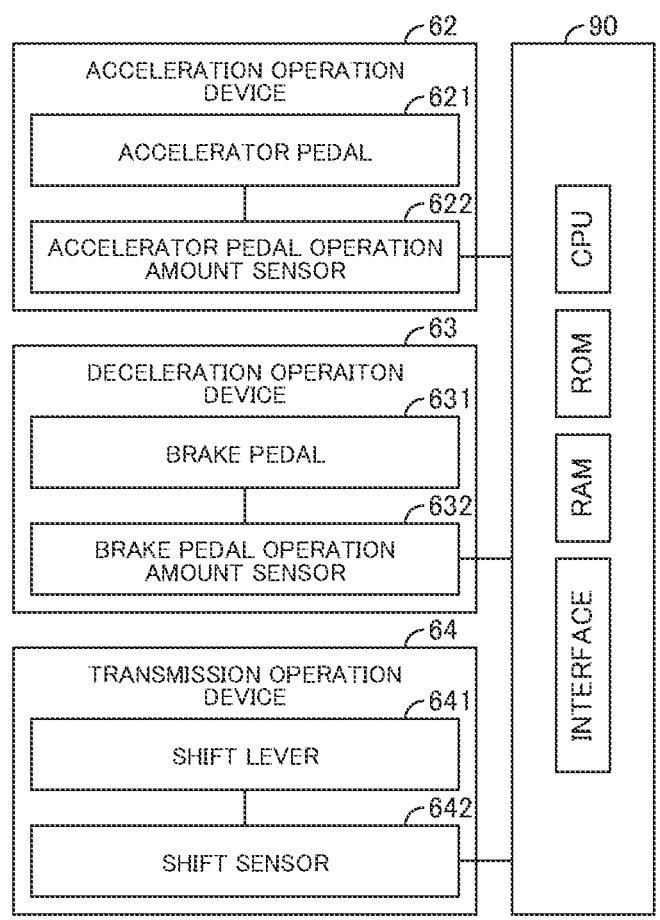
FIG. 2 is a view which shows a part of the vehicle control apparatus according to the embodiment of the present invention.

The acceleration operation device 62 is a device which the driver uses to accelerate the vehicle 100. In this embodiment, as shown in FIG. 2, the acceleration operation device 62 includes an accelerator pedal 621 and an accelerator pedal operation amount sensor 622.

The accelerator pedal 621 is a device which is operated by the driver. The accelerator pedal operation amount sensor 622 is a device which detects an operation amount of the accelerator pedal 621. The accelerator pedal operation amount sensor 622 is electrically connected to the ECU 90. The ECU 90 acquires the operation amount of the accelerator pedal 621 as an accelerator pedal operation amount AP by the accelerator pedal operation amount sensor 622. The ECU 90 calculates an acceleration rate of the vehicle 100 requested by the driver as a driver request acceleration rate Ga_driver, based on the accelerator pedal operation amount AP. When the driver request acceleration rate Ga_driver is greater than zero, and an automatic braking control described later is not executed, the ECU 90 controls the driving force output from the driving apparatus 20 so as to realize the acceleration rate of the vehicle 100 corresponding to the driver request acceleration rate Ga_driver.

It should be noted that when the operator of the vehicle 100 is the remote operator of the vehicle 100, the acceleration operation device 62 is installed on the remote operation facility.

Deceleration Operation Device

The deceleration operation device 63 is a device which the driver uses to decelerate the vehicle 100. In this embodiment, as shown in FIG. 2, the deceleration operation device 63 includes a brake pedal 631 and a brake pedal operation amount sensor 632.

The brake pedal 631 is a device which is operated by the driver. The brake pedal operation amount sensor 632 is a device which detects an operation amount of the brake pedal 631. The brake pedal operation amount sensor 632 is electrically connected to the ECU 90. The ECU 90 acquires the operation amount of the brake pedal 631 as a brake pedal operation amount BP by the brake pedal operation amount sensor 632. The ECU 90 calculates a deceleration rate of the vehicle 100 requested by the driver as a driver request deceleration rate Gd_driver, based on the brake pedal operation amount BR When the driver request deceleration rate Gd_driver is greater than zero, and the automatic braking control described later is not executed, the ECU 90 controls the braking force output from the braking apparatus 30 so as to realize the deceleration rate of the vehicle 100 corresponding to the driver request deceleration rate Gd_driver.

It should be noted that when the operator of the vehicle 100 is the remote operator of the vehicle 100, the deceleration operation device 63 is installed on the remote operation facility.

Transmission Operation Device

The transmission operation device 64 is a device which the driver uses to set the transmitting state of the gearbox 41. In this embodiment, as shown in FIG. 2, the transmission operation device 64 includes a shift lever 641 and a shift sensor 642.

The shift lever 641 is a device which is operated by the driver. The driver can operate the shift lever 641 and set a position of the shift lever 641 at any one of the forward driving position (or the drive position), the rearward driving position (or the reverse position), the neutral position, and the vehicle-stopped holding position (or the parking position). The shift sensor 642 is electrically connected to the ECU 90. The ECU 90 acquires the position of the shift lever 641 by the shift sensor 642. When the position of the shift lever 641 is set at the drive position, the ECU 90 sets the transmitting state of the gearbox 41 at the drive transmitting state. When the position of the shift lever 641 is set at the reverse position, the ECU 90 sets the transmitting state of the gearbox 41 at the reverse transmitting state. When the position of the shift lever 641 is set at the neutral position, the ECU 90 sets the transmitting state of the gearbox 41 at the neutral state. When the position of the shift lever 641 is set at the parking position, the ECU 90 sets the transmitting state of the gearbox 41 at the parking state.

It should be noted that when the operator of the vehicle 100 is the remote operator of the vehicle 100, the transmission operation device 64 is installed on the remote operation facility.

Assistance Level Setting Device

The assistance level setting device 65 is a device which the driver uses to set the assistance level by the deceleration assistance control described later. The assistance level setting device 65 may be a switch provided on a steering wheel of the vehicle 100, or a touch panel of a car navigation device.

The assistance level by the deceleration assistance control is a level of assisting a deceleration operation carried out by the driver to decelerate the vehicle 100 by the deceleration assistance control. In this embodiment, the driver can set the assistance level to any one of a weak assistance level (i.e., a relatively low assistance level), a middle assistance level, and a strong assistance level (i.e., a relatively high assistance level).

When the deceleration assistance control is the automatic braking control described later, and the assistance level is the weak assistance level, a target deceleration rate Gd_tgt and a target deceleration rate increasing speed R_tgt described later are set to a relatively small deceleration rate and a relatively small increasing speed, respectively. Further, when the deceleration assistance control is the automatic braking control, and the assistance level is the middle assistance level, the target deceleration rate Gd_tgt and the target deceleration rate increasing speed R_tgt are set to a middle deceleration rate and a middle increasing speed, respectively. Further, when the deceleration assistance control is the automatic braking control, and the assistance level is the strong assistance level, the target deceleration rate Gd_tgt and the target deceleration rate increasing speed R_tgt are set to a relatively great deceleration rate and a relatively great increasing speed, respectively. Thereby, the deceleration rate of the vehicle 100 and the increasing speed thereof vary, depending on the assistance level while the deceleration assistance control is being executed.

Further, when the deceleration assistance control is a deceleration notification control described later, and the assistance level is the weak assistance level, a deceleration proposal image is displayed with color tone and/or luminance in a manner that a probability of the driver recognizing the deceleration proposal image, is relatively low, and a deceleration proposal announcement is output with volume in a manner that a probability of the driver recognizing the deceleration proposal announcement, is relatively low. Further, when the deceleration assistance control is the deceleration notification control described later, and the assistance level is the middle assistance level, the deceleration proposal image is displayed with the color tone and/or the luminance in a manner that the probability of the driver recognizing the deceleration proposal image, is middle, and the deceleration proposal announcement is output with the volume in a manner that the probability of the driver recognizing the deceleration proposal announcement, is middle. Further, when the deceleration assistance control is the deceleration notification control described later, and the assistance level is the strong assistance level, the deceleration proposal image is displayed with the color tone and/or the luminance in a manner that the probability of the driver recognizing the deceleration proposal image, is relatively high, and the deceleration proposal announcement is output with the volume in a manner that the probability of the driver recognizing the deceleration proposal announcement, is relatively high. Thereby, the manner of proposing the deceleration of the vehicle 100 varies, depending on the assistance level while the deceleration assistance control is being executed.

Further, when the assistance level is the weak assistance level, an assistance start inter-vehicle distance Df_start and an assistance start point distance Dp_start described later are set to relatively short distances, respectively. Further, when the assistance level is the middle assistance level, the assistance start inter-vehicle distance Df_start and the assistance start point distance Dp_start are set to middle distances, respectively. Further, when the assistance level is the strong assistance level, the assistance start inter-vehicle distance Df_start and the assistance start point distance Dp_start are set to relatively long distances, respectively. Thereby, a timing of starting executing the deceleration assistance control varies, depending on the assistance level.

It should be noted that when the operator of the vehicle 100 is the remote operator of the vehicle 100, the assistance level setting device 65 is installed on the remote operation facility.

Vehicle Speed Detection Device

The vehicle moving speed detection device 66 is a device which detects a moving speed of the vehicle 100. The vehicle moving speed detection device 66 includes, for example, vehicle wheel rotation speed sensors provided on vehicle wheels of the vehicle 100, respectively. The vehicle moving speed detection device 66 is electrically connected to the ECU 90. The ECU 90 acquires the moving speed of the vehicle 100 as an own vehicle moving speed V by the vehicle moving speed detection device 66.

Surrounding Information Detection Apparatus

The surrounding information detection apparatus 70 is an apparatus which acquires information on a situation around the vehicle 100. In this embodiment, the surrounding information detection apparatus 70 includes image sensors 71, electromagnetic wave sensors 72, and a GPS device 73.

The image sensors 71 are sensors which capture views around the vehicle 100 to acquire image data. The image sensors 71 are, for example, camera sensors. The image sensors 71 are electrically connected to the ECU 90. The ECU 90 acquires the image data as surrounding detection information IS from the image sensors 71.

In particular, the ECU 90 detects a curved road, a traffic light, and a stop line ahead of the vehicle 100, based on the image data as the surrounding detection information IS.

The electromagnetic wave sensors 72 are sensors which acquire object data, i.e., data on objects around the vehicle 100. The electromagnetic wave sensors 72 are, for example, radio wave sensors such as radar sensors such as millimeter wave sensors, sound wave sensors such as ultrasonic wave sensors such as clearance sonars, and optical sensors such as laser radars such as LiDARs. The electromagnetic wave sensors 72 transmit electromagnetic waves. When the transmitted electromagnetic waves are reflected by objects, the electromagnetic wave sensors 72 receive the reflected waves, i.e., the electromagnetic waves reflected by the objects. The object data corresponds to information on the transmitted electromagnetic waves and the reflected waves. The electromagnetic wave sensors 72 are electrically connected to the ECU 90. The ECU 90 acquires the object data as the surrounding detection information IS from the electromagnetic wave sensors 72.

Figure 3:
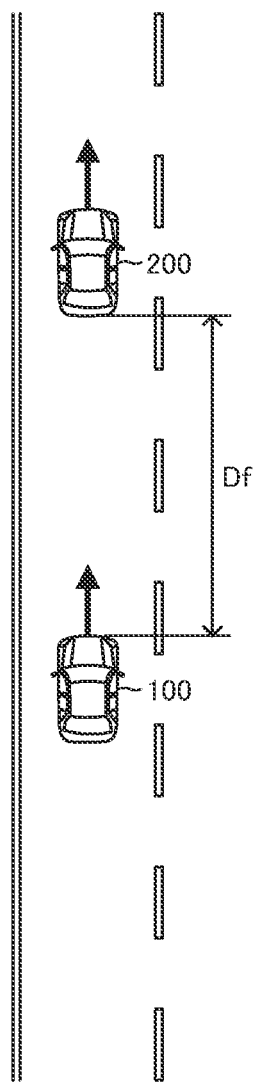
FIG. 3 is a view which shows a preceding vehicle and an inter-vehicle distance.

In particular, when there is a preceding vehicle 200 as shown in FIG. 3, the ECU 90 detects the preceding vehicle 200, based on the object data as the surrounding detection information IS and acquires an inter-vehicle distance Df, i.e., a distance between the preceding vehicle 200 and the vehicle 100. It should be noted that the preceding vehicle 200 is a vehicle which moves ahead of the vehicle 100 within a predetermined distance from the vehicle 100 in a traffic lane in which the vehicle 100 moves.

The GPS device 73 is a device which receives GPS signals and acquires a present position of the vehicle 100 and map information on an area around the vehicle 100. In this embodiment, the GPS device 73 includes a GPS receiver 731 and a map database 732. The map information on the area around the vehicle 100 includes information on a road on which the vehicle 100 moves.

The GPS receiver 731 receives the GPS signals. The GPS receiver 731 is electrically connected to the ECU 90. The ECU 90 acquires the present position of the vehicle 100 as the surrounding detection information IS, based on the GPS signals received by the GPS receiver 731.

The map database 732 is a device which stores the map information. The map database 732 is electrically connected to the ECU 90. The ECU 90 acquires the map information on the area around the vehicle 100 as the surrounding detection information IS from the map database 732, based on the present position of the vehicle 100.

In particular, the ECU 90 detects the curved road, the traffic light, and the stop line ahead of the vehicle 100, based on the map information as the surrounding detection information IS.

It should be noted that the surrounding information detection apparatus 70 may be configured to include a device which receives information on roads transmitted from facilities provided at the side of the roads. In this case, the surrounding information detection apparatus 70 may be configured to acquire the information on the roads transmitted from the facilities as the surrounding detection information IS and detect the curved road, the traffic light, and the stop line ahead of the vehicle 100, based on the acquired surrounding detection information IS.

Operations of Vehicle Deceleration Assistance Apparatus

Next, operations of the vehicle control apparatus 10 will be described. When the vehicle 100 is near the preceding vehicle or the curved road, the driver operates the brake pedal 631 to decelerate the vehicle 100. The vehicle control apparatus 10 is configured to execute the deceleration assistance control for assisting the deceleration operation of decelerating the vehicle 100 by the driver when the driver tries to decelerate the vehicle 100.

In this embodiment, the deceleration assistance control includes the automatic braking control and the deceleration notification control. In this regard, the deceleration assistance control may include only one of the automatic braking control and the deceleration notification control.

The automatic braking control is a control to autonomously decelerate the vehicle 100 by autonomously applying the braking force to the vehicle 100, or autonomously decreasing the driving force applied to the vehicle 100 to a certain value or zero when a predetermined condition or an assistance start condition C_start becomes satisfied.

The assistance start condition C_start for a situation that the preceding vehicle 200 as a deceleration assistance target is detected, is a condition that (i) the inter-vehicle distance Df is equal to or shorter than an assistance start inter-vehicle distance Df_start (i.e., a predetermined distance as an assistance start distance D_start) and (ii) neither the accelerator pedal 621 nor the brake pedal 631 is operated.

Further, the assistance start condition C_start for a situation that a target point such as the curved road, the traffic light, and the stop line as the deceleration assistance target is detected, is a condition that (i) a target point distance Fp (i.e., a distance between the vehicle 100 and the target point) is equal to or shorter than a predetermined distance as the assistance start point distance D_start (i.e., an assistance start inter-vehicle distance Dp_start) and (ii) neither the accelerator pedal 621 nor the brake pedal 631 is operated.

The vehicle control apparatus 10 is configured to set the assistance start inter-vehicle distance Df_start, depending on the own vehicle moving speed V. In particular, the vehicle control apparatus 10 is configured to set the assistance start inter-vehicle distance Df_start such that the assistance start inter-vehicle distance Df_start for the high own vehicle moving speed V is greater than the assistance start inter-vehicle distance Df_start for the low own vehicle moving speed V. In particular, the vehicle control apparatus 10 is configured to set the assistance start inter-vehicle distance Df_start such that the assistance start inter-vehicle distance Df_start increases as the own vehicle moving speed V increases.

Similarly, the vehicle control apparatus 10 is configured to set the assistance start point distance Dp_start, depending on the own vehicle moving speed V. In particular, the vehicle control apparatus 10 is configured to set the assistance start point distance Dp_start such that the assistance start point distance Dp_start for the high own vehicle moving speed V is greater than the assistance start point distance Dp_start for the low own vehicle moving speed V. In particular, the vehicle control apparatus 10 is configured to set the assistance start point distance Dp_start such that the assistance start point distance Dp_start increases as the own vehicle moving speed V increases.

Further, under the situation that the preceding vehicle 200 is detected as the deceleration assistance target, the vehicle control apparatus 10 executes the automatic braking control to (i) set a target deceleration rate Gd_tgt and a target deceleration rate increasing speed R_tgt, and (ii) decelerate the vehicle 100 until the inter-vehicle distance Df becomes greater than the assistance start inter-vehicle distance Df_start, increasing the deceleration rate of the vehicle 100 to the target deceleration rate Gd_tgt at an increasing speed corresponding to the target deceleration rate increasing speed R_tgt. The target deceleration rate Gd_tgt is a target value of the deceleration rate of the vehicle 100. The target deceleration rate increasing speed R_tgt is a target value of a speed of increasing the deceleration rate of the vehicle 100 to the target deceleration rate Gd_tgt.

It should be noted that the vehicle control apparatus 10 may be configured to set the target deceleration rate increasing speed R_tgt to a predetermined constant speed while the vehicle control apparatus 10 executes the automatic braking control under the situation that the preceding vehicle 200 is detected as the deceleration assistance target.

Further, under the situation that the target point such as the curved road, the traffic light, and the stop line is detected as the deceleration assistance target, the vehicle control apparatus 10 executes the automatic braking control to (i) set the target deceleration rate Gd_tgt and the target deceleration rate increasing speed R_tgt such that the own vehicle moving speed V is equal to or lower than a predetermined speed at a point of time when the vehicle 100 reaches the target point, and (ii) decelerate the vehicle 100, increasing the deceleration rate of the vehicle 100 to the target deceleration rate Gd_tgt at the increasing speed corresponding to the target deceleration rate increasing speed R_tgt.

It should be noted that the vehicle control apparatus 10 may be configured to set the target deceleration rate increasing speed R_tgt to a predetermined constant speed while the vehicle control apparatus 10 executes the automatic braking control under the situation that the target point such as the curved road, the traffic light, and the stop line is detected as the deceleration assistance target.

Further, the vehicle control apparatus 10 may be configured to execute the automatic braking control to (i) set the target deceleration rate Gd_tgt and the target deceleration rate increasing speed R_tgt, independently of whether the own vehicle moving speed V is equal to or lower than the predetermined speed at the point of time when the vehicle 100 reaches the target point, and (ii) decelerate the vehicle 100, increasing the deceleration rate of the vehicle 100 to the target deceleration rate Gd_tgt at the increasing speed corresponding to the target deceleration rate increasing speed R_tgt.

As can be understood from the above description, the vehicle control apparatus 10 is an apparatus which performs an automatic driving or an autonomous driving of the vehicle 100.

The deceleration notification control is a control to provide the driver of the vehicle 100 with a deceleration proposal notification (i.e., a notification to propose the deceleration of the vehicle 100 to the operator of the vehicle 100) by the notification device 50 when the assistance start condition C_start becomes satisfied. In particular, the deceleration notification control is a control to display a deceleration proposal image (i.e., an image such as a pop-up image to propose the deceleration of the vehicle 100) by the displaying device 51 and/or output a deceleration proposal announcement (i.e., an announcement to propose the deceleration of the vehicle 100) from the sound device 52.

Setting Change Proposal and Setting Change

When the automatic braking control starts being executed, the vehicle 100 automatically starts being decelerated. In this case, the driver may feel that the deceleration rate of the vehicle 100 is too great, or the timing of starting executing the automatic braking control is too early. In this case, the driver may make several operations to the brake pedal 631 or the accelerator pedal 621 with small operation amounts.

Further, the driver had felt that the deceleration rate of the vehicle 100 by the automatic braking control is too great, or the timing of starting executing the automatic braking control is too early. In this case, the driver may make several operations to the brake pedal 631 or the accelerator pedal 621 with small operation amounts when the automatic braking control is not executed, in particular, just before the automatic braking control starts being executed.

Also, the driver may feel that a manner of the deceleration proposal notification is too strong, or the timing of starting executing the deceleration notification control is too early. In this case, the driver may make several operations to the brake pedal 631 or the accelerator pedal 621 with small operation amounts.

Further, the driver had felt that the manner of the deceleration proposal notification is too strong, or the timing of starting executing the deceleration notification control is too early. In this case, the driver may make several operations to the brake pedal 631 or the accelerator pedal 621 with small operation amounts when the automatic braking control is not executed, in particular, just before the automatic braking control starts being executed.

Accordingly, when a weak acceleration operation or a weak deceleration operation satisfying a predetermined condition C_set is carried out a predetermined number of times N_th or more, the vehicle control apparatus 10 executes a setting change proposal control or a setting change control. In this regard, the setting change proposal control is a control to propose a decrease of the assistance level by the deceleration assistance control to the operator. The setting change control is a control to autonomously decrease the assistance level by the deceleration assistance control. Further, the predetermined condition C_set is a condition that (i) the accelerator pedal 621 or the brake pedal 631 is operated, and (ii) a degree of the operation to the accelerator pedal 621 (or a degree of an acceleration operation) or a degree of the operation to the brake pedal 631 (or a degree of a deceleration operation) continues being equal to or smaller than a predetermined degree for a predetermined period of time T_th or more.

In this embodiment, the predetermined number of times N_th is set to an integer number equal to or greater than one. Further, in this embodiment, the vehicle control apparatus 10 is configured to (i) count the number of times that the weak acceleration operation is carried out and the number of times that the weak deceleration operation is carried out and (ii) determine whether a total of the number of times that the weak acceleration operation is carried out and the number of times that the weak deceleration operation is carried out, is equal to or greater than the predetermined number of times N_th. In this regard, the vehicle control apparatus 10 may be configured to determine whether the number of times that the weak acceleration operation is carried out, is equal to or greater than the predetermined number of times N_th, and whether the number of times that the weak deceleration operation is carried out, is equal to or greater than the predetermined number of times N_th.

In particular, in this embodiment, the predetermined condition C_set is set as described below.

First Condition

The predetermined condition C_set for a situation that (i) the deceleration assistance control is executed, and (ii) the accelerator pedal 621 is operated, is a first condition C1 that (i) the accelerator pedal 621 is operated, and (ii) the degree of the operation to the accelerator pedal 621 continues being equal to or smaller than a first degree for a first period of time T1 or more. In this case, when the weak acceleration operation to the accelerator pedal 621 satisfying the first condition C1 is carried out a first number of times N1 or more, the setting change proposal control or the setting change control is executed.

In particular, the first condition C1 is a condition that (i) the accelerator pedal 621 is operated, and (ii) the accelerator pedal operation amount AP continues being equal to or smaller than an upper limit accelerator pedal operation amount AP_up and equal to or greater than a lower limit accelerator pedal operation amount AP_low (i.e., the degree of the operation to the accelerator pedal 621 continues being equal to or smaller than the first degree) for the first period of time T1 or more.

In other words, the first condition C1 is a condition that (i) the accelerator pedal 621 is operated, and (ii) the accelerator pedal operation amount AP continues being within a predetermined accelerator pedal operation amount range Rap (i.e., the degree of the operation to the accelerator pedal 621 is equal to or smaller than the first degree) for the first period of time T1 or more.

It should be noted that the predetermined accelerator pedal operation amount range Rap is a range equal to or smaller than the upper limit accelerator pedal operation amount AP_up and equal to or greater than the lower limit accelerator pedal operation amount AP_low.

Further, the predetermined accelerator pedal operation amount range Rap is set to a relatively narrow range around an acceleration request determination threshold AP_th. It should be noted that the vehicle control apparatus 10 is configured to acquire the accelerator pedal operation amount AP with respect to the accelerator pedal operation amount AP corresponding to the acceleration request determination threshold AP_th where the accelerator pedal operation amount AP corresponding to the acceleration request determination threshold AP_th is used as zero amounts. Therefore, when the accelerator pedal operation amount AP is smaller than the acceleration request determination threshold AP_th, the accelerator pedal operation amount AP acquired by the vehicle control apparatus 10 is zero. On the other hand, when the accelerator pedal operation amount AP is equal to or greater than the acceleration request determination threshold AP_th, the accelerator pedal operation amount AP acquired by the vehicle control apparatus 10 is greater than zero.

Second Condition

The predetermined condition C_set for a situation that (i) the deceleration assistance control is not executed (in particular, the deceleration assistance target is detected, but the deceleration assistance control is not executed), and (ii) the accelerator pedal 621 is operated, is a second condition C2 that (i) the accelerator pedal 621 is operated, (ii) the degree of the operation to the accelerator pedal 621 continues being equal to or smaller than a second degree for a second period of time T2 or more, and (iii) the deceleration rate of the vehicle 100 is equal to or smaller than a predetermined deceleration rate or a non-assistance acceleration operation deceleration rate Gd_a. In this case, when the weak acceleration operation to the accelerator pedal 621 satisfying the second condition C2 is carried out a second number of times N2 or more, the setting change proposal control or the setting change control is executed.

In particular, the second condition C2 is a condition that (i) the accelerator pedal 621 is operated, (ii) the accelerator pedal operation amount AP continues being equal to or smaller than the upper limit accelerator pedal operation amount AP_up and equal to or greater than the lower limit accelerator pedal operation amount AP_low (i.e., the degree of the operation to the accelerator pedal 621 continues being equal to or smaller than the second degree) for the second period of time T2 or more, and (iii) the deceleration rate of the vehicle 100 is equal to or smaller than the non-assistance acceleration operation deceleration rate Gd_a.

In other words, the second condition C2 is a condition that (i) the accelerator pedal 621 is operated, (ii) the accelerator pedal operation amount AP continues being within the predetermined accelerator pedal operation amount range Rap (i.e., the degree of the operation to the accelerator pedal 621 is equal to or smaller than the second degree) for the second period of time T2 or more, and (iii) the deceleration rate of the vehicle 100 is equal to or smaller than the non-assistance acceleration operation deceleration rate Gd_a.

In this embodiment, the non-assistance acceleration operation deceleration rate Gd_a is set to a relatively small value.

Third Condition

Further, the predetermined condition C_set for a situation that (i) the deceleration assistance control is executed, and (ii) the brake pedal 631 is operated, is a third condition C3 that (i) the brake pedal 631 is operated, and (ii) the degree of the operation to the brake pedal 631 continues being equal to or smaller than a third degree for a third period of time T3 or more. In this case, when the weak deceleration operation to the brake pedal 631 satisfying the third condition C3 is carried out a third number of times N3 or more, the setting change proposal control or the setting change control is executed.

In particular, the third condition C3 is a condition that (i) the brake pedal 631 is operated, and (ii) the brake pedal operation amount BP continues being equal to or greater than a predetermined brake pedal operation amount BP_th, but an increasing speed of the brake pedal operation amount BP continues being equal to or smaller than a predetermined speed or a predetermined brake pedal operation amount increasing speed Rbp_th (i.e., the degree of the operation to the brake pedal 631 continues being equal to or smaller than the third degree) for the third period of time T3 or more.

Fourth Condition

The predetermined condition C_set for a situation that (i) the deceleration assistance control is not executed (in particular, the deceleration assistance target is detected, but the deceleration assistance control is not executed), and (ii) the brake pedal 631 is operated, is a fourth condition C4 that (i) the brake pedal 631 is operated, (ii) the degree of the operation to the brake pedal 631 continues being equal to or smaller than a fourth degree for a fourth period of time T4 or more, and (iii) the deceleration rate of the vehicle 100 is equal to or smaller than a predetermined deceleration rate or a non-assistance deceleration operation deceleration rate Gd_d. In this case, when the weak declaration operation to the brake pedal 631 satisfying the fourth condition C4 is carried out a fourth number of times N4 or more, the setting change proposal control or the setting change control is executed.

In particular, the fourth condition C4 is a condition that (i) the brake pedal 631 is operated, (ii) the brake pedal operation amount BP continues being equal to or greater than the predetermined brake pedal operation amount BP_th, but the increasing speed of the brake pedal operation amount BP continues being equal to or smaller than the predetermined brake pedal operation amount increasing speed Rbp_th (i.e., the degree of the operation to the brake pedal 631 continues being equal to or smaller than the fourth degree) for the fourth period of time T4 or more, and (iii) the deceleration rate of the vehicle 100 is equal to or smaller than the non-assistance deceleration operation deceleration rate Gd_d.

In this embodiment, the non-assistance deceleration operation deceleration rate Gd_d is set to a relatively small value.

With the vehicle control apparatus 10, when the weak acceleration or deceleration operation satisfying the predetermined condition C_set that the degree of the acceleration operation (i.e., the operation to the accelerator pedal 621) or the deceleration operation (i.e., the operation to the brake pedal 631) continues being equal to or smaller than the predetermined degree for the predetermined period of time T_th, is carried out the predetermined number of times N_th or more, the decrease of the assistance level by the deceleration assistance control is proposed to the driver, or the assistance level by the deceleration assistance control is autonomously decreased. Thus, the decrease of the assistance level by the deceleration assistance control can be appropriately proposed to the driver, or the assistance level by the deceleration assistance control can be appropriately and autonomously decreased.

The driver having a feeling that the assistance level by the deceleration assistance control is excessive, may carry out the weak acceleration or deceleration operation in different manners, depending on whether the deceleration assistance control is executed or not, in particular, whether the deceleration assistance control is executed or the deceleration assistance target is detected, but the deceleration assistance control is not executed. Therefore, in order to accurately determine that the driver has a feeling that the assistance level by the deceleration assistance control is excessive, it is effective to use different conditions for proposing the decrease of the assistance level by the deceleration assistance control to the driver, or autonomously decreasing the assistance level by the deceleration assistance control, depending on whether the deceleration assistance control is executed or not, in particular, whether the deceleration assistance control is executed or the deceleration assistance target is detected, but the deceleration assistance control is not executed.

With the vehicle control apparatus 10, the predetermined condition C_set used when the deceleration assistance control is executed, and the predetermined condition C_set used when the deceleration assistance control is not executed (in particular, the deceleration assistance target is detected, but the deceleration assistance control is not executed) are different. Thus, the decrease of the assistance level by the deceleration assistance control can be proposed to the driver, or the assistance level by the deceleration assistance control can be autonomously decreased, depending on an accurate determination of whether the driver has a feeling that the assistance level by the deceleration assistance control is excessive.

Manner of Setting Change

The driver may have different feelings of excessiveness of the assistance level by the deceleration assistance control, depending on whether the driver carries out the weak acceleration or deceleration operation while the deceleration assistance control is executed, or the driver carries out the weak acceleration or deceleration operation while the deceleration assistance target is detected, but the deceleration assistance control is not executed (in particular, just before the deceleration assistance control starts being executed).

Accordingly, in this embodiment, the different manners of autonomously decreasing the assistance level by the deceleration assistance control are used, depending on whether the weak acceleration operation satisfying the first condition C1 is carried out the first number of times N1 or more, or the weak acceleration operation satisfying the second condition C2 is carried out the second number of times N2 or more.

In particular, when the weak acceleration operation satisfying the first condition C1 is carried out the first number of times N1 or more, the target deceleration rate Gd_tgt and the target deceleration rate increasing speed R_tgt used by the automatic braking control are decreased by the setting change control, and the manners used by the deceleration notification control to display the deceleration proposal image and output the deceleration proposal announcement are changed to the manners having the low probability that the driver recognizes the deceleration proposal image and the deceleration proposal announcement. On the other hand, when the weak acceleration operation satisfying the second condition C2 is carried out the second number of times N2 or more, the assistance start inter-vehicle distance Df_start and the assistance start point distance Dp_start are increased by the setting change control.

Further, in this embodiment, the different manners of autonomously decreasing the assistance level by the deceleration assistance control are used, depending on whether (i) the weak deceleration operation satisfying the third condition C3 is carried out the third number of times N3 or more, or (ii) the weak deceleration operation satisfying the fourth condition C4 is carried out the fourth number of times N4 or more.

In particular, when the weak deceleration operation satisfying the third condition C3 is carried out the third number of times N3 or more, the target deceleration rate Gd_tgt or the target deceleration rate increasing speed R_tgt used by the automatic braking control is decreased, and the manners used by the deceleration notification control to display the deceleration proposal image and output the deceleration proposal announcement are changed to the manners having the low probability that the driver recognizes the deceleration proposal image and the deceleration proposal announcement. On the other hand, when the weak deceleration operation satisfying the fourth condition C4 is carried out the fourth number of times N4 or more, the assistance start inter-vehicle distance Df_start and the assistance start distance D_start are increased by the setting change control.

Thereby, the different manners of autonomously decreasing the assistance level are used, depending on whether (i) the weak acceleration or deceleration operation satisfying the first condition C1 is carried out the first number of times N1 or more, or (ii) the weak acceleration or deceleration operation satisfying the second condition C2 is carried out the second number of times N2 or more. Further, the different manners of autonomously decreasing the assistance level are used, depending on whether (i) the weak acceleration or deceleration operation satisfying the third condition C3 is carried out the third number of times N3 or more, or (ii) the weak acceleration or deceleration operation satisfying the fourth condition C4 is carried out the fourth number of times N4 or more. Thus, the assistance level can be autonomously decreased, depending on the driver's feeling that the assistance level by the deceleration assistance control is excessive.

Execution Timing of Deceleration Assistance Control

Further, in this embodiment, when (i) the own vehicle moving speed V becomes zero, or (ii) the shift lever 641 is set at the parking position, or (iii) the activation operation device 61 is operated to deactivate the ECU 90, the setting change proposal control and the setting change control are executed. That is, the setting change proposal control and the setting change control are executed when (i) an execution permission condition C_exe that the own vehicle moving speed V becomes zero, or (ii) the execution permission condition C_exe that the shift lever 641 is set at the parking position, or (iii) the activation operation device 61 is operated to deactivate the ECU 90, becomes satisfied.

Reset of Weak Acceleration and Deceleration Operation Numbers of Times

Further, the feeling of the excessiveness of the assistance level by the deceleration assistance control varies, depending on the drivers of the vehicle 100. Therefore, in order to accurately determine that the driver has a feeling that the assistance level by the deceleration assistance control is excessive, it is effective to consider that the drivers of the vehicle 100 change in determining whether the driver has a feeling that the assistance level by the deceleration assistance control is excessive. In this regard, when a state of the vehicle 100 changes from a state that the vehicle 100 can move to a state that the vehicle 100 cannot move, the drivers of the vehicle 100 may change.

Accordingly, while the vehicle 100 is in the activated state that the vehicle 100 can move, the vehicle control apparatus 10 acquires (i) a weak acceleration operation number of times that the weak acceleration operation satisfying the first condition C1 is carried out, (ii) the weak acceleration operation number of times that the weak acceleration operation satisfying the second condition C2 is carried out, (iii) a weak deceleration operation number of times that the weak deceleration operation satisfying the third condition C3 is carried out, and (iv) the weak deceleration operation number of times that the weak deceleration operation satisfying the fourth condition C4 is carried out. Then, the vehicle control apparatus 10 resets the acquired weak acceleration operation number of times and the acquired weak deceleration operation number of times, that is, sets the acquired weak acceleration operation number of times and the acquired weak deceleration operation number of times to zero, respectively when the state of the vehicle 100 is changed from the activated state to the non-activated state. In other words, the acquired weak acceleration operation number of times and the acquired weak deceleration operation number of times are reset every one trip.

In this regard, the vehicle control apparatus 10 may be configured to reset the acquired weak acceleration operation number of times and the acquired weak deceleration operation number of times each time the vehicle 100 has moved a predetermined distance.

Thereby, when the state of the vehicle 100 is changed from the activated state to the non-activated state, the acquired weak acceleration operation number of times and the acquired weak deceleration operation number of times are reset. Thus, the decrease of the assistance level is appropriately proposed, or the assistance level is appropriately and autonomously decreased, depending on the driver's feeling that the assistance level by the deceleration assistance control is excessive.

In this embodiment, the vehicle control apparatus 10 is configured not to determine that the weak acceleration or deceleration operation is carried out when the driver request deceleration rate Gd_driver is equal to or generally equal to the target deceleration rate Gd_tgt while the automatic braking control is being executed.

Specific Operations of Vehicle Deceleration Assistance Apparatus

Figure 4:
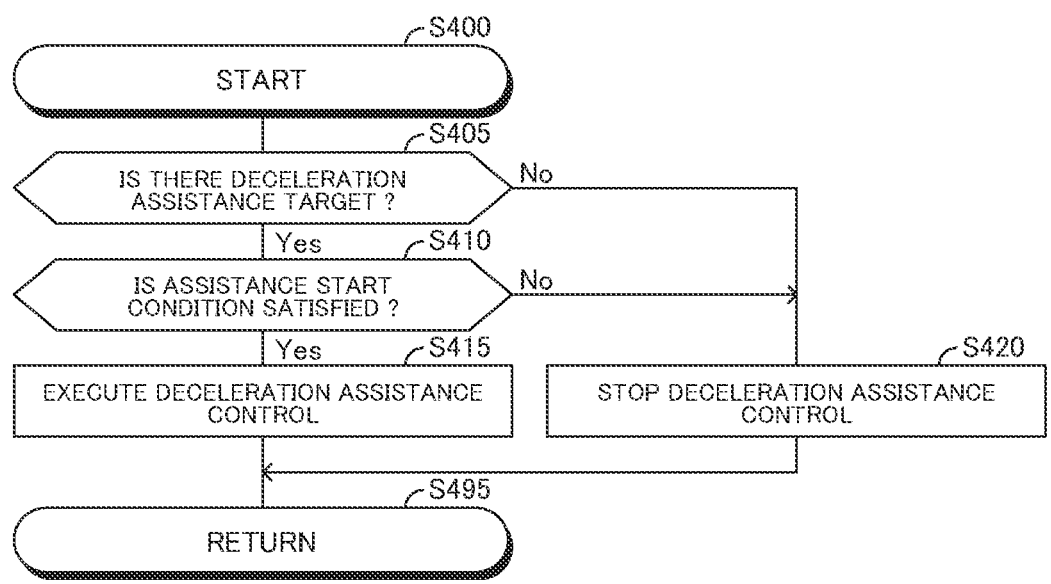
FIG. 4 is a view which shows a flowchart of a routine executed by the vehicle control apparatus according to the embodiment of the present invention.

Next, specific operations of the vehicle control apparatus 10 will be described. The vehicle control apparatus 10 is configured to execute a routine shown in FIG. 4 at predetermined calculation intervals. Therefore, at a predetermined timing, the vehicle control apparatus 10 starts a process from a step S400 of the routine shown in FIG. 4 and proceeds with the process to a step S405 to determine whether the deceleration assistance target is detected.

When the vehicle control apparatus 10 determines "Yes" at the step S405, the vehicle control apparatus 10 proceeds with the process to a step S410 to determine whether the assistance start condition C_start is satisfied. When the vehicle control apparatus 10 determines "Yes" at the step S410, the vehicle control apparatus 10 proceeds with the process to a step S415 to execute the deceleration assistance control. Then, the vehicle control apparatus 10 proceeds with the process to a step S495 to terminate executing this routine once.

On the other hand, when the vehicle control apparatus 10 determines "No" at the step S410, the vehicle control apparatus 10 proceeds with the process to a step S420 to stop executing the deceleration assistance control when the vehicle control apparatus 10 executes the deceleration assistance control. Then, the vehicle control apparatus 10 proceeds with the process to the step S495 to terminate executing this routine once.

Further, when the vehicle control apparatus 10 determines "No" at the step S405, the vehicle control apparatus 10 proceeds with the process to the step S420 to stop executing the deceleration assistance control when the vehicle control apparatus 10 executes the deceleration assistance control. Then, the vehicle control apparatus 10 proceeds with the process to the step S495 to terminate executing this routine once.

Figure 5:
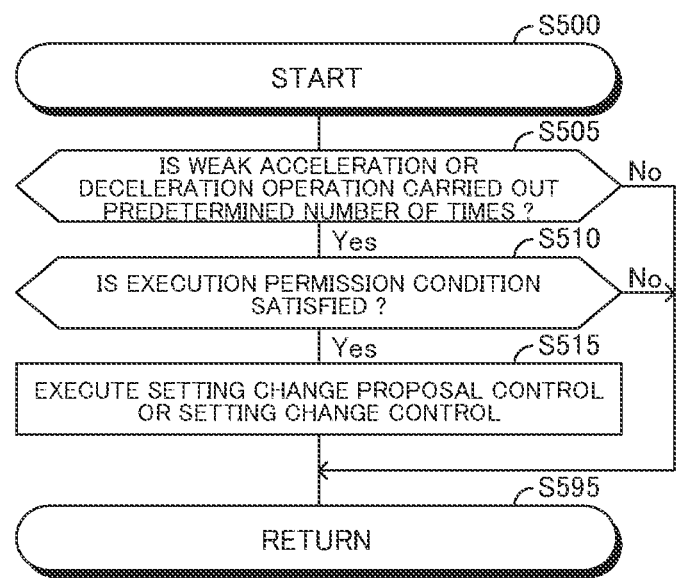
FIG. 5 is a view which shows a flowchart of a routine executed by the vehicle control apparatus according to the embodiment of the present invention.

Further, the vehicle control apparatus 10 is configured to execute a routine shown in FIG. 5 at the predetermined calculation intervals. Therefore, at a predetermined timing, the vehicle control apparatus 10 starts a process from a step S500 and proceeds with the process to a step S505 to determine whether the weak acceleration or deceleration operation is carried out the predetermined number of times N_th or more.

When the vehicle control apparatus 10 determines "Yes" at the step S505, the vehicle control apparatus 10 increases the weak acceleration or deceleration operation number of times by one and then, proceeds with the process to a step S510 to determine whether the execution permission condition C_exe is satisfied. When the vehicle control apparatus 10 determines "Yes" at the step S510, the vehicle control apparatus 10 proceeds with the process to a step S515 to execute the setting change proposal control or the setting change control. Then, the vehicle control apparatus 10 proceeds with the process to a step S595 to terminate executing this routine once.

On the other hand, when the vehicle control apparatus 10 determines "No" at the step S510, the vehicle control apparatus 10 proceeds with the process directly to the step S595 to terminate executing this routine once.

Further, when the vehicle control apparatus 10 determines "No" at the step S505, the vehicle control apparatus 10 proceeds with the process directly to the step S595 to terminate executing this routine once.

Figure 6:
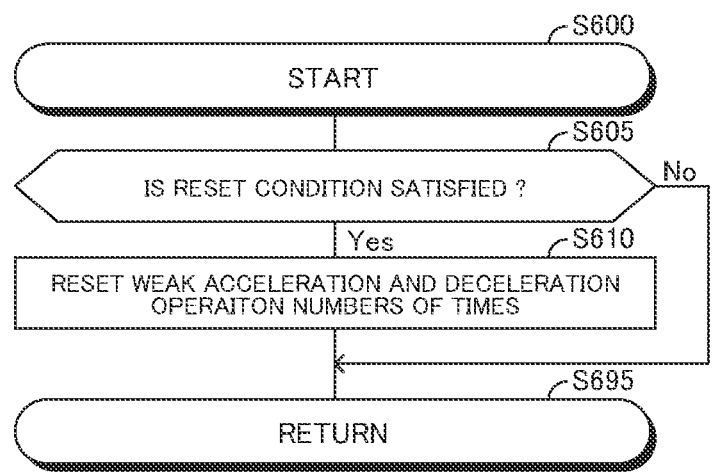
FIG. 6 is a view which shows a flowchart of a routine executed by the vehicle control apparatus according to the embodiment of the present invention.

Further, the vehicle control apparatus 10 is configured to execute a routine shown in FIG. 6 at the predetermined calculation intervals. Therefore, at a predetermined timing, the vehicle control apparatus 10 starts a process from a step S600 and proceeds with the process to a step S605 to determine whether a reset condition C_reset is satisfied.

When the vehicle control apparatus 10 determines "Yes" at the step S605, the vehicle control apparatus 10 proceeds with the process to a step S610 to reset the weak acceleration operation number of times and the weak deceleration operation number of times. Then, the vehicle control apparatus 10 proceeds with the process to a step S695 to terminate executing this routine once.

On the other hand, when the vehicle control apparatus 10 determines "No" at the step S605, the vehicle control apparatus 10 proceeds with the process directly to the step S695 to terminate executing this routine once.

The specific operations of the vehicle control apparatus 10 have been described.

It should be noted that the invention is not limited to the aforementioned embodiments, and various modifications can be employed within the scope of the invention.

What is claimed is:

1. A vehicle deceleration assistance apparatus, comprising an electronic control unit which executes a deceleration assistance control for assisting a deceleration of a vehicle when (i) a distance between the vehicle and a deceleration assistance target becomes equal to or smaller than a predetermined distance, and (ii) an acceleration operation and a deceleration operation are not carried out by an operator of the vehicle,
wherein the electronic control unit is configured to:
(i) propose a decrease of an assistance level by the deceleration assistance control by decreasing an assistance degree from a first assistance degree to a second assistance degree that is lower than the first assistance degree or delaying an assistance start time to the operator or (ii) autonomously decrease the assistance level by the deceleration assistance control by decreasing the assistance degree from the first assistance degree to the second assistance degree or delaying the assistance start time when a weak acceleration operation is carried out a predetermined weak acceleration operation number of times or more,
the weak acceleration operation being the acceleration operation satisfying a predetermined acceleration operation condition that the acceleration operation having an acceleration operation degree equal to or smaller than a predetermined acceleration operation degree, continues being carried out for a predetermined acceleration operation period of time; or
(i) propose the decrease of the assistance level by the deceleration assistance control by decreasing the assistance degree from the first assistance degree to the second assistance degree or delaying the assistance start time to the operator or (ii) autonomously decrease the assistance level by the deceleration assistance control by decreasing the assistance degree from the first assistance degree to the second assistance degree or delaying the assistance start time when a weak deceleration operation is carried out a predetermined weak deceleration operation number of times or more,
the weak deceleration operation being the deceleration operation satisfying a predetermined deceleration operation condition that the deceleration operation having a deceleration operation degree equal to or smaller than a predetermined deceleration operation degree, continues being carried out for a predetermined deceleration operation period of time.

2. The vehicle deceleration assistance apparatus as claimed in claim 1,
wherein when (i) the deceleration assistance control is executed, and (ii) the acceleration operation is carried out,
a first condition is used as the predetermined acceleration operation condition,
a first degree is used as the predetermined acceleration operation degree,
a first period of time is used as the predetermined acceleration operation period of time, and
the first condition is a condition that the acceleration operation having the acceleration operation degree equal to or smaller than the first degree, continues being carried out for the first period of time,
wherein when (i) the deceleration assistance control is not executed, and (ii) the acceleration operation is carried out,
a second condition is used as the predetermined acceleration operation condition,
a second degree is used as the predetermined acceleration operation degree,
a second period of time is used as the predetermined acceleration operation period of time, and
the second condition is a condition that (i) the acceleration operation having the acceleration operation degree equal to or smaller than the second degree, continues being carried out for the second period of time, and (ii) a deceleration rate of the vehicle is equal to or smaller than a non-assistance acceleration operation deceleration rate,
wherein when (i) the deceleration assistance control is executed, and (ii) the deceleration operation is carried out,
a third condition is used as the predetermined deceleration operation condition,
a third degree is used as the predetermined deceleration operation degree,
a third period of time is used as the predetermined deceleration operation period of time, and the third condition is a condition that the deceleration operation having the deceleration operation degree equal to or smaller than the third degree, continues being carried out for the third period of time, and wherein when (i) the deceleration assistance control is not executed, and (ii) the deceleration operation is carried out,
a fourth condition is used as the predetermined deceleration operation condition,
a fourth degree is used as the predetermined deceleration operation degree,
a fourth period of time is used as the predetermined deceleration operation period of time, and
the fourth condition is a condition that (i) the deceleration operation having the deceleration operation degree equal to or smaller than the fourth degree, continues being carried out for the fourth period of time, and (ii) the deceleration rate of the vehicle is equal to or smaller than a non-assistance deceleration operation deceleration rate.

3. The vehicle deceleration assistance apparatus as claimed in claim 2,
wherein the electronic control unit is configured to:
autonomously decrease the assistance level when (i) the weak acceleration operation satisfying the predetermined acceleration operation condition is carried out the predetermined weak acceleration operation number of times or more, or (ii) the weak deceleration operation satisfying the predetermined deceleration operation condition is carried out the predetermined weak deceleration operation number of times or more;
use different manners of autonomously decreasing the assistance level, depending on whether (i) the weak acceleration operation satisfying the first condition is carried out the predetermined weak acceleration operation number of times or more, or (ii) the weak acceleration operation satisfying the second condition is carried out the predetermined weak acceleration operation number of times or more, and
use different manners of autonomously decreasing the assistance level, depending on whether (i) the weak deceleration operation satisfying the third condition is carried out the predetermined weak deceleration operation number of times or more, or (ii) the weak deceleration operation satisfying the fourth condition is carried out the predetermined weak deceleration operation number of times or more.

4. The vehicle deceleration assistance apparatus as claimed in claim 1,
wherein when (i) the deceleration assistance control is executed, and (ii) the acceleration operation is carried out,
a first condition is used as the predetermined acceleration operation condition,
a first degree is used as the predetermined acceleration operation degree,
a first period of time is used as the predetermined acceleration operation period of time, and
the first condition is a condition that the acceleration operation having the acceleration operation degree equal to or smaller than the first degree, continues being carried out for the first period of time,
wherein when (i) the deceleration assistance target is detected, (ii) the deceleration assistance control is not executed, and (iii) the acceleration operation is carried out,
a second condition is used as the predetermined acceleration operation condition,
a second degree is used as the predetermined acceleration operation degree,
a second period of time is used as the predetermined acceleration operation period of time, and
the second condition is a condition that (i) the acceleration operation having the acceleration operation degree equal to or smaller than the second degree, continues being carried out for the second period of time, and (ii) a deceleration rate of the vehicle is equal to or smaller than a non-assistance acceleration operation deceleration rate, wherein when (i) the deceleration assistance control is executed, and (ii) the deceleration operation is carried out,
a third condition is used as the predetermined deceleration operation condition,
a third degree is used as the predetermined deceleration operation degree,
a third period of time is used as the predetermined deceleration operation period of time, and
the third condition is a condition that the deceleration operation having the deceleration operation degree equal to or smaller than the third degree, continues being carried out for the third period of time, and wherein when (i) the deceleration assistance target is detected, (ii) the deceleration assistance control is not executed, and (iii) the deceleration operation is carried out,
a fourth condition is used as the predetermined deceleration operation condition,
a fourth degree is used as the predetermined deceleration operation degree,
a fourth period of time is used as the predetermined deceleration operation period of time, and
the fourth condition is a condition that (i) the deceleration operation having the deceleration operation degree equal to or smaller than the fourth degree, continues being carried out for the fourth period of time, and (ii) the deceleration rate of the vehicle is equal to or smaller than a non-assistance deceleration operation deceleration rate.

5. The vehicle deceleration assistance apparatus as claimed in claim 4,
wherein the electronic control unit is configured to:
autonomously decrease the assistance level when (i) the weak acceleration operation satisfying the predetermined acceleration operation condition is carried out the predetermined weak acceleration operation number of times or more, or (ii) the weak deceleration operation satisfying the predetermined deceleration operation condition is carried out the predetermined weak deceleration operation number of times or more;
use different manners of autonomously decreasing the assistance level, depending on whether (i) the weak acceleration operation satisfying the first condition is carried out the predetermined weak acceleration operation number of times or more, or (ii) the weak acceleration operation satisfying the second condition is carried out the predetermined weak acceleration operation number of times or more, and
use different manners of autonomously decreasing the assistance level, depending on whether (i) the weak deceleration operation satisfying the third condition is carried out the predetermined weak deceleration operation number of times or more, or (ii) the weak deceleration operation satisfying the fourth condition is carried out the predetermined weak deceleration operation number of times or more.

6. The vehicle deceleration assistance apparatus as claimed in claim 1,
wherein the electronic control unit is configured to:
acquire the number of times that the weak acceleration operation or the weak deceleration operation is carried out while the vehicle is in an activated state that the vehicle can move; and
reset the acquired number of times when the vehicle changes from the activated state to a non-activated state that the vehicle cannot move.

7. The vehicle deceleration assistance apparatus as claimed in claim 1, wherein the decreasing the assistance degree from the first assistance degree to the second assistance degree comprises decreasing at least one of the deceleration rate, a speed of an increase in the deceleration rate, and an ability to make the driver recognize the notification proposing deceleration, and
wherein the assistance start timing is delayed by shortening at least one of the assistance start inter-vehicle distance and the assistance start point distance.

8. A vehicle deceleration assistance method for executing a deceleration assistance control for assisting a deceleration of a vehicle when (i) a distance between the vehicle and a deceleration assistance target becomes equal to or smaller than a predetermined distance, and (ii) an acceleration operation and a deceleration operation are not carried out by an operator of the vehicle,
wherein the vehicle deceleration assistance method comprises at least one of steps of:
(i) propose a decrease of an assistance level by the deceleration assistance control by decreasing an assistance degree from a first assistance degree to a second assistance degree that is lower than the first assistance degree or delaying an assistance start time to the operator or (ii) autonomously decrease the assistance level by the deceleration assistance control by decreasing the assistance degree from the first assistance degree to the second assistance degree or delaying the assistance start time when a weak acceleration operation is carried out a predetermined weak acceleration operation number of times or more,
the weak acceleration operation being the acceleration operation satisfying a predetermined acceleration operation condition that the acceleration operation having an acceleration operation degree equal to or smaller than a predetermined acceleration operation degree, continues being carried out for a predetermined acceleration operation period of time; and
(i) propose the decrease of the assistance level by the deceleration assistance control by decreasing the assistance degree from the first assistance degree to the second assistance degree or delaying the assistance start time to the operator or (ii) autonomously decrease the assistance level by the deceleration assistance control by decreasing the assistance degree from the first assistance degree to the second assistance degree or delaying the assistance start time when a weak deceleration operation is carried out a predetermined weak deceleration operation number of times or more,
the weak deceleration operation being the deceleration operation satisfying a predetermined deceleration operation condition that the deceleration operation having a deceleration operation degree equal to or smaller than a predetermined deceleration operation degree, continues being carried out for a predetermined deceleration operation period of time.

9. A computer-readable storage medium storing a vehicle driving assistance program which executes a deceleration assistance control for assisting a deceleration of a vehicle when (i) a distance between the vehicle and a deceleration assistance target becomes equal to or smaller than a predetermined distance, and (ii) an acceleration operation and a deceleration operation are not carried out by an operator of the vehicle,
wherein the vehicle deceleration assistance program is configured to:
(i) propose a decrease of an assistance level by the deceleration assistance control by decreasing an assistance degree from a first assistance degree to a second assistance degree that is lower than the first assistance degree or delaying an assistance start time to the operator or (ii) autonomously decrease the assistance level by the deceleration assistance control by decreasing the assistance degree from the first assistance degree to the second assistance degree or delaying the assistance start time when a weak acceleration operation is carried out a predetermined weak acceleration operation number of times or more,
the weak acceleration operation being the acceleration operation satisfying a predetermined acceleration operation condition that the acceleration operation having an acceleration operation degree equal to or smaller than a predetermined acceleration operation degree, continues being carried out for a predetermined acceleration operation period of time; or
(i) propose the decrease of the assistance level by the deceleration assistance control by decreasing the assistance degree from the first assistance degree to the second assistance degree or delaying the assistance start time to the operator or (ii) autonomously decrease the assistance level by the deceleration assistance control by decreasing the assistance degree from the first assistance degree to the second assistance degree or delaying the assistance start time when a weak deceleration operation is carried out a predetermined weak deceleration operation number of times or more,
the weak deceleration operation being the deceleration operation satisfying a predetermined deceleration operation condition that the deceleration operation having a deceleration operation degree equal to or smaller than a predetermined deceleration operation degree, continues being carried out for a predetermined deceleration operation period of time.

* * * * *